(12) United States Patent
Lusted et al.

(10) Patent No.: US 6,631,335 B2
(45) Date of Patent: Oct. 7, 2003

(54) METHOD AND APPARATUS FOR GENERATOR STATOR BAR WEDGE PRESSURE TESTING

(75) Inventors: Roderick Mark Lusted, Niskayuna, NY (US); William Edward Lancaster, Ballston Lake, NY (US); Adam Zachary Krass, Ballston Lake, NY (US)

(73) Assignee: General Electric Co., Schenectady, NY (US)

(*) Notice: Subject to any disclaimer, the term of this patent is extended or adjusted under 35 U.S.C. 154(b) by 0 days.

(21) Appl. No.: 09/681,898

(22) Filed: Jun. 21, 2001

(65) Prior Publication Data
US 2002/0198669 A1 Dec. 26, 2002

(51) Int. Cl.⁷ ................................................ G01F 7/00
(52) U.S. Cl. .......................................................... 702/56
(58) Field of Search .............................. 702/56, 33, 76, 702/98; 73/862.41, 570; 324/76.19

(56) References Cited

U.S. PATENT DOCUMENTS

| | | | | |
|---|---|---|---|---|
| 4,739,207 A | | 4/1988 | Ying et al. ................... 310/214 |
| 4,901,572 A | * | 2/1990 | Suyama ......................... 73/572 |
| 5,109,700 A | * | 5/1992 | Hicho ............................ 73/660 |
| 5,353,631 A | * | 10/1994 | Woringer et al. ............... 73/52 |
| 5,684,718 A | * | 11/1997 | Jenkins et al. ................. 702/57 |
| 5,877,431 A | * | 3/1999 | Hirano ...................... 73/862.41 |
| 6,069,473 A | | 5/2000 | Hatley .................... 324/207.18 |

OTHER PUBLICATIONS

European Search Report (EP 02 25 5302) dated Nov. 15, 2002.

* cited by examiner

Primary Examiner—Michael Nghiem
(74) Attorney, Agent, or Firm—Hunton & Williams

(57) ABSTRACT

Systems and methods are provided for measuring pressure on a member. The systems and methods include exciting the member to create a vibratory response in the member and detecting the vibratory response. The vibratory response is then compared to at least one of a plurality of previously recorded vibratory responses of the member. The pressure on the member is then estimated based on the comparison of the vibratory response to the plurality of previously recorded vibratory responses.

10 Claims, 6 Drawing Sheets

$$f_1 = \left( \frac{\sum_{b=1}^{b=n}(F_m * M_b)}{\sum_{b=1}^{b=n} M_b} \right)$$

$f_1$ = center of energy
b = frequency bin index
$F_m$ = Midpoint frequency of frequency bin
$M_b$ = Magnitude of frequency bin
n = highest index number TEST WEDGE #4 TEST-139- SAMPLE-3 of 3 at
Sithe Unit #1 "LOOSE WEDGE"
5-5-01

TEST WEDGE #5 TEST-149- SAMPLE-3 of 3 at
Sithe Unit #1 Controlled Tightness-120 Mil filler
5-5-01

TEST WEDGE #5 TEST-153- SAMPLE-3 of 3 at
Sithe Unit #1 Controlled Tightness-150 Mil filler
5-5-01

METHOD AND APPARATUS FOR GENERATOR STATOR BAR WEDGE PRESSURE TESTING

BACKGROUND OF THE INVENTION

Embodiments of the invention relate to testing procedures. More particularly, embodiments of the invention relate to the analysis of data collected in connection with testing pressure.

Electric generator stator bars are constrained from movement within slots in the stator by a wedge system. If the wedge system becomes loose, the stator bars can move relative to the slots. This relative motion contributes to bar insulation abrasion and potential bar failure via short to ground. Currently, although wedge systems are designed to engineering unit (pressure or force per unit length) constraints, wedge system tightness assessments cannot be related to those engineering design unit constraints for accurate assessment of required maintenance.

Two methods for semi-quantitative assessment of the tightness of a generator's wedging system currently exist. The first is a modification of the Brinnell/Rockwell hardness test and employs rebound velocity of a spring-loaded pin or arm. The second is a technique that applies a multi-tap forcing function to a wedge and measures the absolute magnitude of the vibrational response in three discrete frequency bands below 1000 Hz.

SUMMARY OF THE INVENTION

Embodiments of the invention include methods for measuring pressure on a member in which the member is excited to create a current vibratory response in the member and the current vibratory response is detected. The current vibratory response is compared to at least one of a plurality of previously recorded vibratory responses of the member. The pressure on the member is then estimated based on the comparison of the current vibratory response to at least one of the plurality of previously recorded vibratory responses.

Embodiments of the invention include a system for measuring pressure on a member. The system having a vibration exciter for exciting the member to create a current vibratory response in the member, a sensor for detecting the current vibratory response, and a data storage device containing previously recorded vibratory responses. The current vibratory response is compared to at least one of the plurality of previously recorded vibratory responses, and the pressure on the member is estimated based on the comparison of the current vibratory response to at least one of the plurality of previously recorded vibratory responses.

Embodiments of the invention include a method for correlating vibratory response to pressure on a member. The method includes exciting the member while the member is subjected to a plurality of different pressures, detecting a vibratory response spectrum for each of the plurality of different pressures; and creating a spectrum-to-pressure correlation table. In the spectrum-to-pressure correlation table, the vibratory response spectrum for each of the plurality of different pressures is correlated to the pressure to which the member was subjected when the vibratory response spectrum was detected.

Embodiments of the invention include a system for correlating vibratory response to pressure on a member. The system has a vibration exciter for exciting the member while the member is subjected to a plurality of different pressures, a sensor for detecting a vibratory response spectrum in the member for each of the plurality of different pressures, and a processor for creating a spectrum-to-pressure correlation table. The system also has a data storage device for storing the spectrum-to-pressure correlation table. The spectrum-to-pressure correlation table contains at least the vibratory response spectrum for each of the plurality of different pressures correlated to the pressure to which the member was subjected when the vibratory response spectrum was detected.

These and other features of the invention will be readily apparent to those skilled in the art upon reading this disclosure in connection with the attached drawing figures.

DETAILED DESCRIPTION OF THE INVENTION

GE Docket No. 17GE-7213 PATENT Atty. Docket No. 59589.0000084 The two methods for semi-quantitative assessment of the tightness of a generator's wedging system discussed above have been in use for several years. However, neither of these methods have the measurement resolution needed to accurately assess wedge pressure. Further, neither method accurately assesses wedge tightness over the full range of operational wedge pressure for a top ripple spring system.

With the introduction of top ripple spring wedging systems, measurement of wedge pressure has become a requirement for accurately assessing the need for wedge system maintenance. Therefore, neither existing method meets current diagnostic needs.

Being able to determine generator stator bar wedge pressure accurately is critical to conducting an effective generator predictive maintenance program. However, measuring wedge pressure accurately is currently a significant problem. This problem is solved by embodiments of the invention that provide a measurement methodology that determines wedge pressure with sufficient accuracy.

A generator wedge tightness evaluation system employing the vibratory transmission and its natural frequency shift relating to different stator bar wedge (wedge) pressures can be used to accurately measure wedge tightness in a generator, that is, in an electromechanical device. This system uses a variety of mechanical excitations to create a vibratory response in wedges. The vibratory response can be detected by numerous methods and is then subjected to on-line or post-processing spectral reduction by, for example, Fast Fourier Transform (FFT) or other means. The spectral analysis can be correlated to the wedge pressure using a proprietary set of algorithms and analysis techniques.

Figure 1:
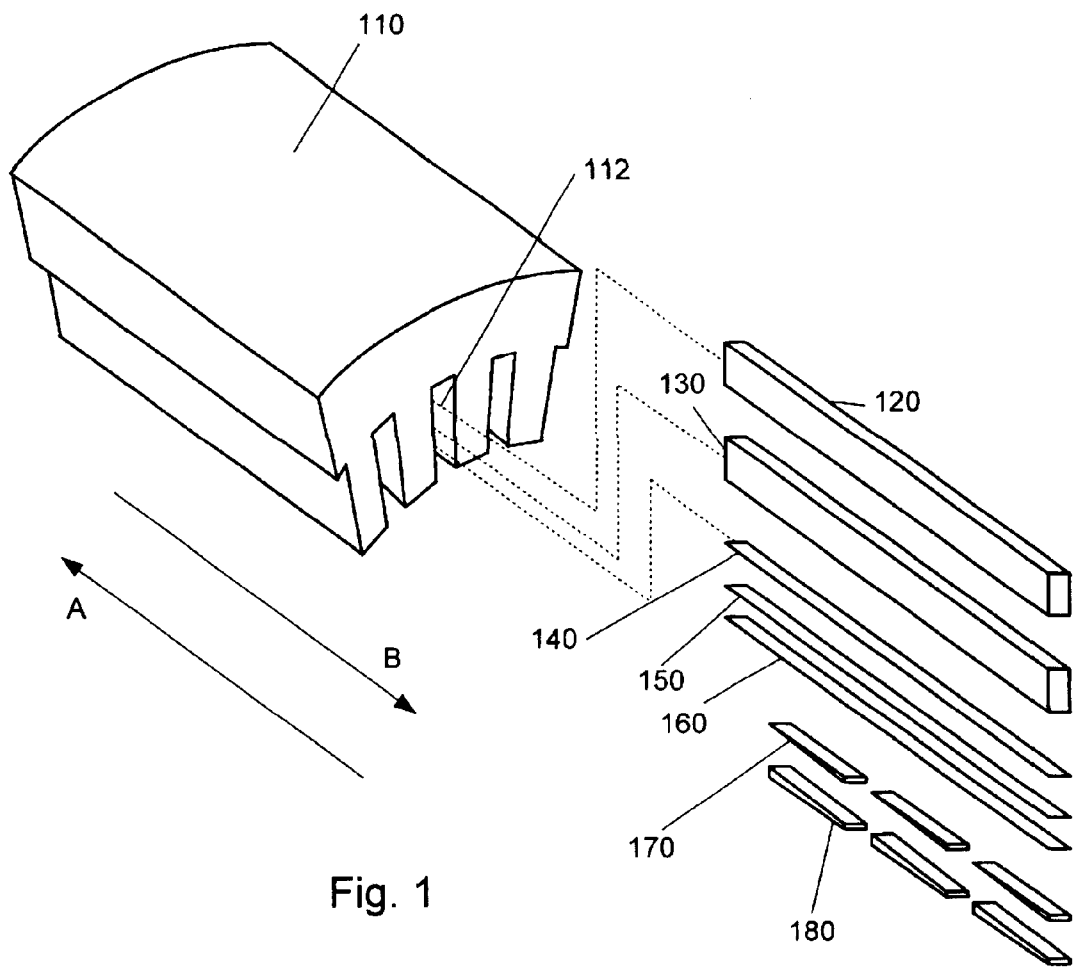
FIG. 1 is a partial exploded view of a electric generator stator.

FIG. 1 shows an example of a portion of an electric generator stator 110 and the associated pieces that fit in one of the slots 112 of stator 110. An outer stator bar 120, an inner stator bar 130, one or more slot fillers 140, 150, and a top ripple spring 160 are held in place by stator wedge slides 170 and stator wedges 180. Moving stator wedge slides 170 in the direction of arrow A relative to stator wedges 180, or moving stator wedges 180 in the direction of arrow B relative to stator wedge slides 170, applies pressure to outer stator bar 120 and inner stator bar 130 in a direction that tends to keep outer stator bar 120 and inner stator bar 130 in slot 112.

As the pressure on a top ripple spring wedge system is increased (or decreased), the frequency spectrum of individual wedges creates an overall frequency modulation relative to that wedge pressure increase (or decrease). That modulation is both predictable and measurable. Embodiments of the invention cover both the method for correlating a spectral shift to pressure for a given wedge system (FIG. 5) and a methodology for data collection and analysis for applying that correlation (FIG. 6).

Spectra are collected for each wedge system of interest at varying pressures to develop a spectrum-to-pressure correlation for that particular wedge system. In the example shown in FIG. 5, in step 510 each wedge is excited at varying pressures to create a vibratory response in each wedge. In step 520, these vibratory responses in each wedge are detected by a sensor. In step 530, the detected vibratory responses are stored in a data storage device. In step 540, a spectral analysis of the detected vibratory responses is performed by, for example, calculating a center energy band of the recorded spectra ($f_1$) from 0 to 20 KHz. In step 550, each wedge system pressure is then correlated to a specific $f_1$. When applied to a full range of wedge pressures, step 560, this methodology results in a spectrum-to-pressure correlation table that can routinely and consistently be applied to the wedge system of interest.

Figures 5, 6:
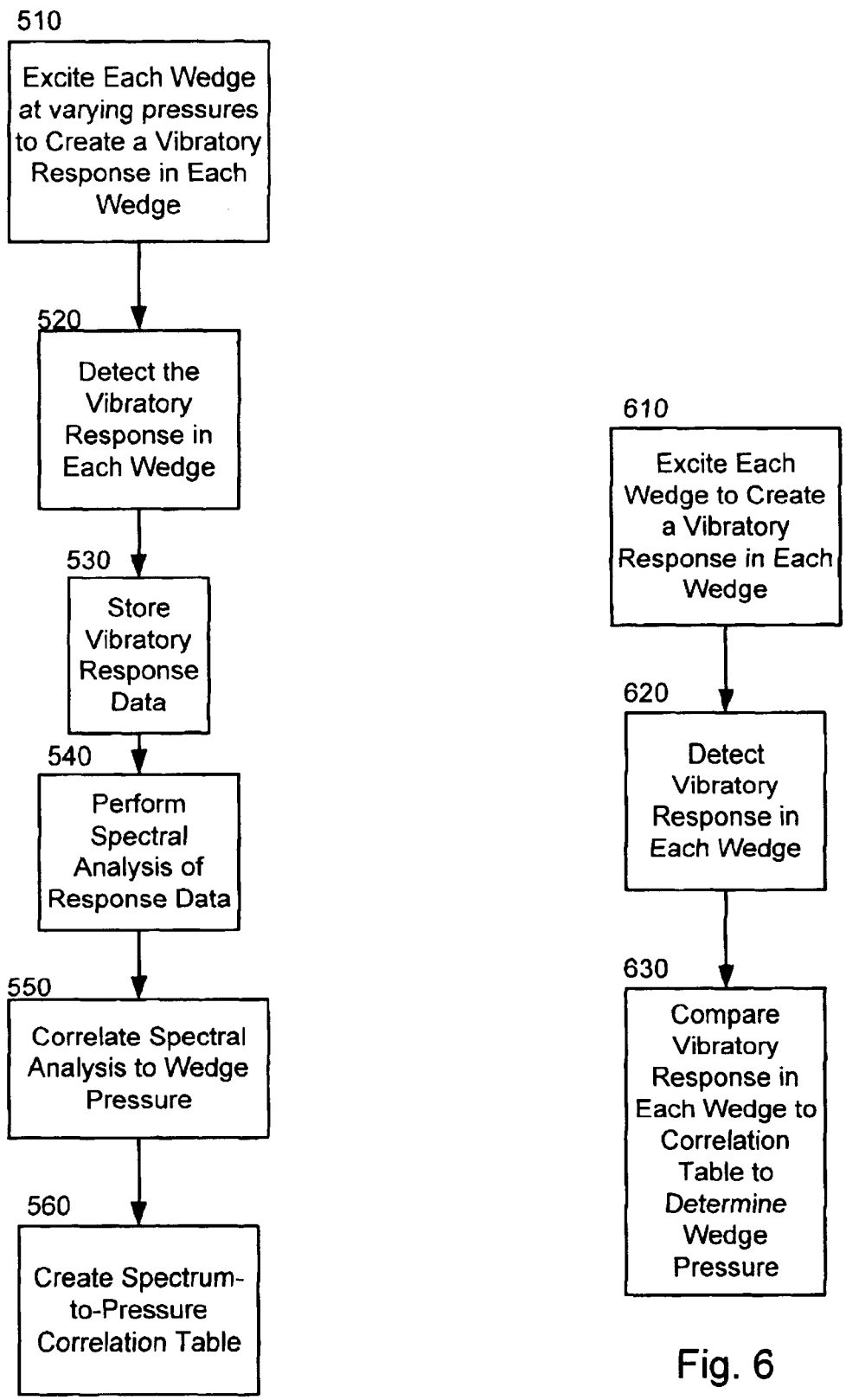
FIG. 5 is a flow chart showing an example of a method of an embodiment of the invention.
FIG. 6 is a flow chart showing an example of a method of an embodiment of the invention.

FIG. 6 shows a method of measuring wedge pressure by collecting vibratory response data and comparing that response data to a correlation table. In step 610, each wedge is excited to create a vibratory response in that wedge. In step 620, the vibratory response created in step 610 is detected. In step 630, the vibratory response in each wedge is compared to a previously prepared spectrum-to-pressure correlation table to determine the pressure of each wedge.

Figures 7, 8:
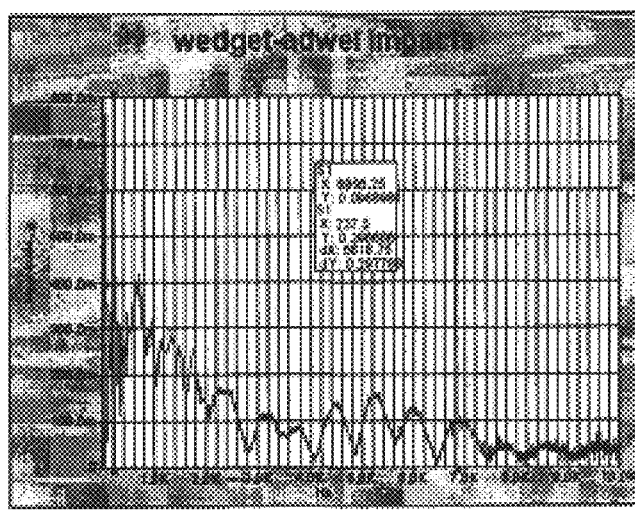
FIG. 7 shows an algorithm used in embodiments of the invention.
FIG. 8 is a graph showing loose wedge test results.

FIG. 7 shows an example of an algorithm that can be used to calculate the center of energy $f_1$. This example of an algorithm is a frequency weighted average of the spectral response. The algorithm in FIG. 7 can be applied to the vibratory response of the excited wedge to determine the center of energy band of the recorded spectra. The algorithm in this example is applied after the response has been converted from the time domain to the frequency domain by post-processing spectral reduction, for example, Fast Fourier Transform or other means. Upon post-processing, the spectral data will have a frequency bin assignment and a magnitude. The center of energy band ($f_1$) can be calculated by applying these domain characteristics to the algorithm shown in FIG. 7. The value of $f_1$ will be correlated to wedge pressure.

While FIG. 7 shows one example of an algorithm that can be used in embodiments of the invention. However, other algorithms can be used. For example, the center of energy could be calculated using integrals (the center of energy band would be the band that divides the entire spectral integral into, for example, two integrals of equal size).

Figure 9:
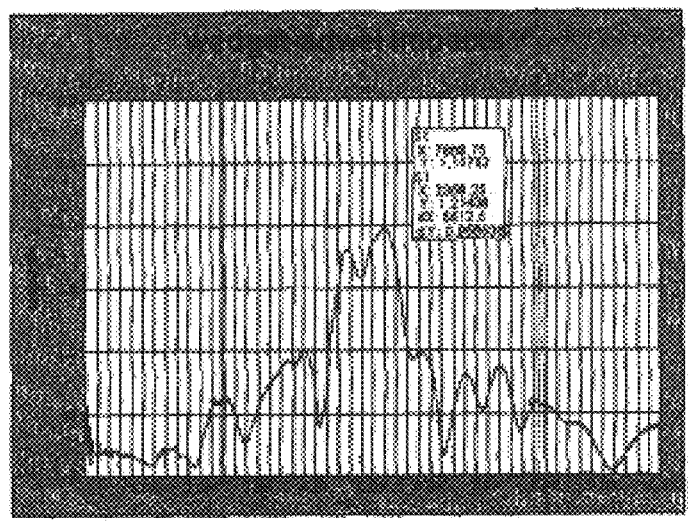
FIG. 9 is a graph showing controlled tightness—120 mil filler test results.
Figure 10:
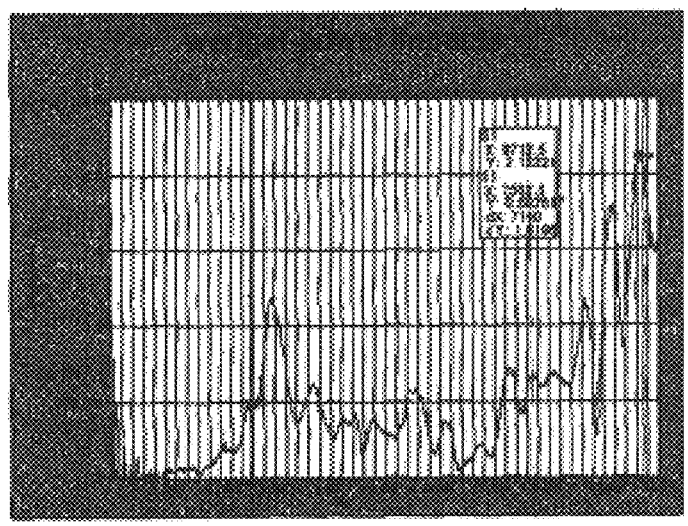
FIG. 10 is a graph showing controlled tightness—150 mil filler test results.
Figure 11:
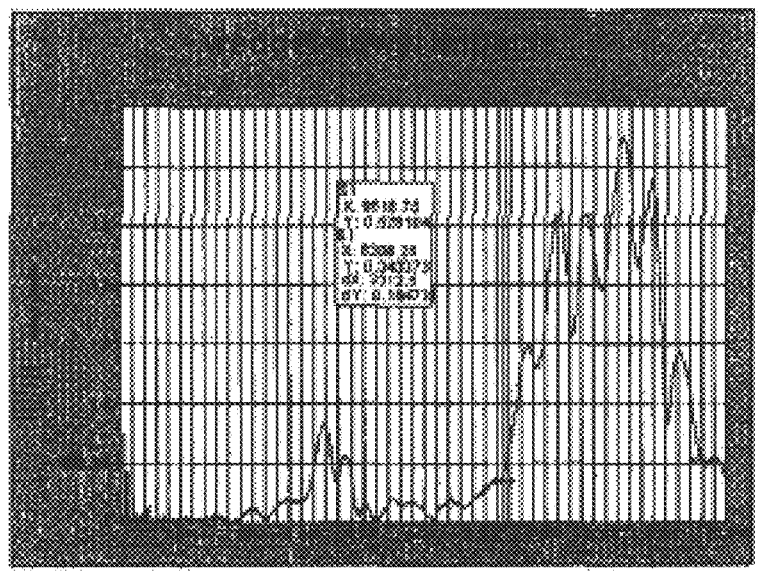
FIG. 11 is a graph showing controlled tightness—165 mil filler test results.

FIGS. 8–11 show test data obtained for what is considered a loose wedge condition (FIG. 8), and three different levels of controlled tightness of the wedge using slot fillers having different thicknesses (FIGS. 9–11). FIGS. 9 and 10 represent mid-range tightness, while FIG. 11 represents a high level of wedge tightness. The spectral plots shown in FIGS. 8–11 were recorded employing a PC based spectral analyzer and a high frequency accelerometer. The data shows that the collective energy band of acceleration increases as a function of wedge tightness.

Figure 2:
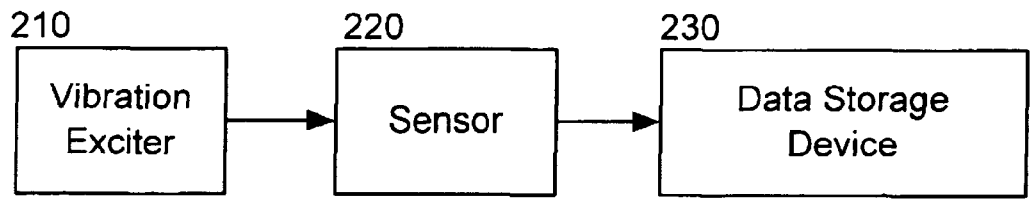
FIG. 2 is a block diagram of an example of a system of an embodiment of the invention.
Figure 3:
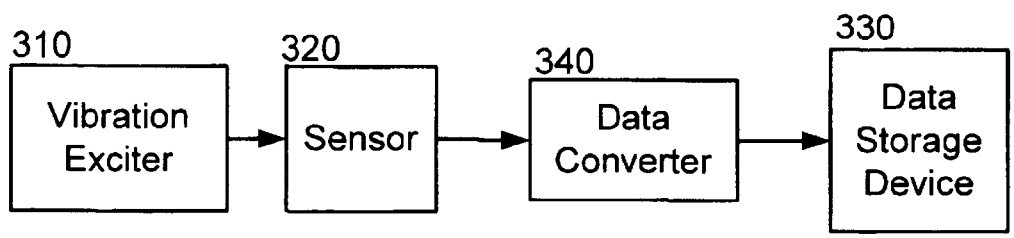
FIG. 3 is a block diagram of an example of a system of an embodiment of the invention.
Figure 4:
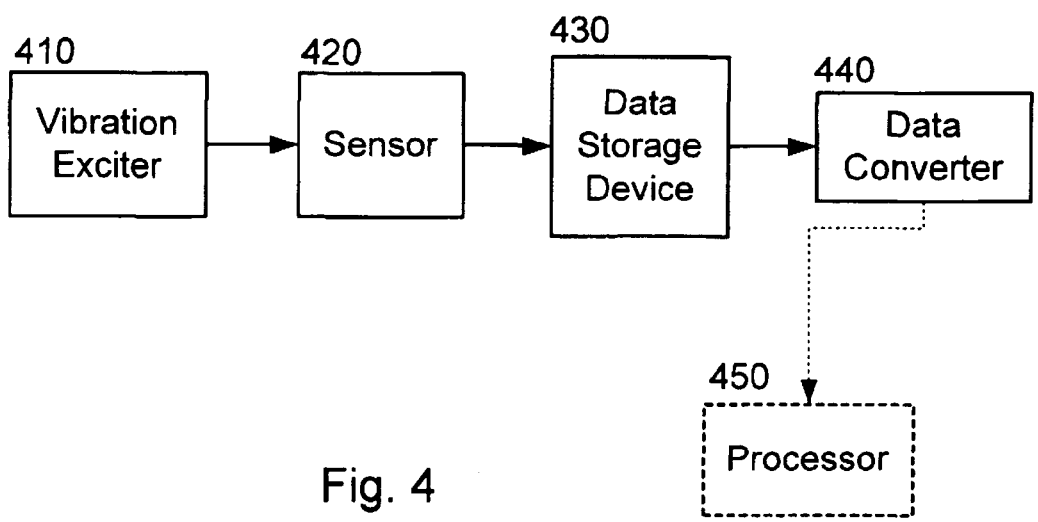
FIG. 4 is a block diagram of an example of a system of an embodiment of the invention.

The data collection can be accomplished using a number of equipment configurations. Embodiments of the invention include equipment configurations containing a vibrational exciter, a sensor and a data storage device. FIG. 2 shows an example of such a configuration. Vibrational exciter 210 is capable of providing excitation for the frequency band of interest as determined in the correlation table development above. Excitation techniques include (but are not limited to) random impact, pink noise, multi-random impact and harmonic excitation. Sensor 220 is capable of recording a linear or near linear (less than 3 dB drop) across the frequency band of interest for the specific wedge system being measured. Sensors might include (but are not limited to) microphones, laser vibrometers and accelerometers. Data storage device 230 can be either analogue or digital. (Analogue devices will preferably be associated with post-processing analogue to digital conversion.) Storage devices might include (but are not limited to) magnetic digital storage, optical digital storage, e-prom and tape recorders. Either before or after storage, the vibrational response data is preferably converted from the time-domain to the frequency domain. This conversion can be accomplished by a number of common methods including, for example, standard Fourier Analysis, FFT or Order Tracking Analysis. FIGS. 3 and 4 show examples of systems similar to what is shown in FIG. 2, except that FIGS. 3 and 4 include a data converter. In FIG. 3, a data converter 340 is located between sensor 320 and data storage device 330. In FIG. 4, a data converter 440 is located downstream of data storage device 430.

An example of a system for analyzing data collected from a wedge system for which a spectrum-to-pressure correlation table already exists is the system shown in FIG. 4 including processor 450. Processor 450 performs the comparison of the vibrational response data to the spectrum-to-pressure correlation table to determine the pressure being exerted on the wedges.

The spectra are analyzed using the same technique described above except that once $f_1$ is identified for a given spectrum, the correlation table created in step 560 of FIG. 5, for example, is then used to determine the wedge pressure.

While the invention has been described with reference to particular embodiments and examples, those skilled in the art will appreciate that various modifications may be made thereto without significantly departing from the spirit and scope of the invention.

What is claimed is:

1. A method for measuring pressure on a member in an electromechanical device, the method comprising:
   exciting the member to create a vibratory response in the member;
   detecting the vibratory response;
   comparing the vibratory response to at least one of a plurality of previously recorded vibratory responses of the member; and
   estimating the pressure on the member based on the comparison of the vibratory response to the at least one of the plurality of previously recorded vibratory responses; and
   further comprising performing spectral analysis on the vibratory response prior to comparing the vibratory response to the previously recorded vibratory responses; and
   wherein the spectral analysis comprises the application of an algorithm to the vibratory response to determine the center of energy band of a spectrum of the vibratory response.

2. The method of claim 1, wherein each of the plurality of previously recorded vibratory responses corresponds to a particular pressure on the member.

3. The method of claim 2, wherein the pressure on the member is estimated by determining which of the plurality of previously recorded vibratory responses most nearly matches the vibratory response.

4. The system of claim 1, wherein the electromechanical device is a generator.

5. A system for measuring pressure on a member in an electromechanical device, the system comprising:
   a vibration exciter for exciting the member to create a vibratory response in the member;
   a sensor for detecting the vibratory response; and
   a data storage device containing previously recorded vibratory responses,
   wherein the vibratory response is compared to at least one of the plurality of previously recorded vibratory responses, and
   the pressure on the member is estimated based on the comparison of the vibratory response to the at least one of the plurality of previously recorded vibratory responses; and
   further comprising a processor,
   wherein the processor performs spectral analysis on the vibratory response prior to the vibratory response being compared to the previously recorded vibratory responses; and
   wherein the spectral analysis comprises the application of an algorithm to the vibratory response to determine the center of energy band of a spectrum of the vibratory response.

6. The system of claim 5, wherein each of the previously recorded vibratory responses corresponds to a particular pressure on the member.

7. The system of claim 5, wherein the pressure on the member is estimated by determining which of the plurality of previously recorded vibratory responses most nearly matches the vibratory response.

8. A method for correlating vibratory response to pressure on a member in an electromechanical device, the method comprising:
   exciting the member while the member is subjected to a plurality of different pressures;
   detecting a vibratory response spectrum for each of the plurality of different pressures; and
   creating a spectrum-to-pressure correlation table in which the vibratory response spectrum for each of the plurality of different pressures is correlated to the pressure to which the member was subjected when the vibratory response spectrum was detected; and
   further comprising performing spectral analysis on the vibratory response data prior to creating the spectrum-to-pressure correlation table; and
   wherein the spectral analysis comprises the application of an algorithm to the vibratory response spectra to determine the center of energy band of each vibratory response spectrum.

9. A system for correlating vibratory response to pressure on a member in an electromechanical device, the system comprising:
   a vibration exciter for exciting the member while the member is subjected to a plurality of different pressures;
   a sensor for detecting a vibratory response spectrum in the member for each of the plurality of different pressures;
   a processor for creating a spectrum-to-pressure correlation table; and
   a data storage device for storing the spectrum-to-pressure correlation table,
   wherein the spectrum-to-pressure correlation table contains at least the vibratory response spectrum for each of the plurality of different pressures correlated to the pressure to which the member was subjected when the vibratory response spectrum was detected; and
   wherein spectral analysis is performed on the vibratory response spectra prior to creating the spectrum-to-pressure correlation table; and
   wherein the spectral analysis comprises the application of an algorithm to the vibratory response spectra to determine the center of energy band of each vibratory response spectrum.

10. A method for measuring pressure on a member, the method comprising:
    exciting the member to create a vibratory response in the member;
    detecting the vibratory response;
    comparing the vibratory response to at least one of a plurality of previously recorded vibratory responses of the member;
    estimating the pressure on the member based on the comparison of the vibratory response to the at least one of the plurality of previously recorded vibratory responses;
    performing spectral analysis on the vibratory response prior to comparing the vibratory response to the previously recorded vibratory responses; and
    wherein the spectral analysis comprises the application of an algorithm to the vibratory response to determine the center of energy band of a spectrum of the vibratory response.

* * * * *